United States Patent
Liu et al.

(10) Patent No.: US 10,451,260 B2
(45) Date of Patent: Oct. 22, 2019

(54) LAMP STRIP

(71) Applicant: GUANGDONG OML TECHNOLOGY CO., LTD, Zhongshan, Guangdong (CN)

(72) Inventors: Huabo Liu, Guangdong (CN); Xiaoping Li, Guangdong (CN)

(73) Assignee: GUANGDONG OML TECHNOLOGY CO., LTD, Zhongshan (CN)

( * ) Notice: Subject to any disclaimer, the term of this patent is extended or adjusted under 35 U.S.C. 154(b) by 0 days.

(21) Appl. No.: 16/143,431

(22) Filed: Sep. 26, 2018

(65) Prior Publication Data

US 2019/0093870 A1 Mar. 28, 2019

(30) Foreign Application Priority Data

Sep. 26, 2017 (CN) .................... 2017 2 1244900 U (51) Int. Cl.
| | |
|---|---|
| *F21V 25/00* | (2006.01) |
| *F21S 4/28* | (2016.01) |
| *F21V 3/06* | (2018.01) |
| *F21V 23/00* | (2015.01) |
| *H05B 33/08* | (2006.01) |
| *F21Y 103/10* | (2016.01) |
| *F21Y 115/10* | (2016.01) |

(52) U.S. Cl.
CPC .............. *F21V 25/00* (2013.01); *F21S 4/28* (2016.01); *F21V 3/062* (2018.02); *F21V 23/002* (2013.01); *H05B 33/089* (2013.01); *H05B 33/0821* (2013.01); *F21Y 2103/10* (2016.08); *F21Y 2115/10* (2016.08); *Y02B 20/341* (2013.01)

(58) Field of Classification Search
CPC ........ F21V 25/00; F21V 3/062; F21V 23/002; F21Y 2103/10; F21Y 2115/10; H05B 33/0821; H05B 33/089; Y02B 20/341; F21S 4/28

See application file for complete search history.

(56) References Cited

U.S. PATENT DOCUMENTS

2006/0221609 A1* 10/2006 Ryan, Jr. .................. F21K 9/00
362/238
2009/0021667 A1* 1/2009 Horiguchi ............ G02B 5/0215
349/64

(Continued)

FOREIGN PATENT DOCUMENTS

| CN | 104333958 A | * | 2/2015 |
|---|---|---|---|
| CN | 206669424 U | | 11/2017 |

OTHER PUBLICATIONS

Machine English Translation of CN104333958A (Year: 2015).*

*Primary Examiner* — Britt D Hanley
*Assistant Examiner* — Glenn D Zimmerman (57) ABSTRACT

The present invention provides a lamp strip, wherein the lamp strip comprises an outer casing, an inner casing and a light-emitting component, the light-emitting component comprises a substrate and an LED light source, wherein the inner casing is provided with a light exit through which the light of the LED light source directly passes. Cut marks are arranged between the light exits, and the side facing the LED light source of the outer casing is of light transmission. The invention facilitates the user to cut the lamp strip and greatly prolongs the service life of the lamp strip.

7 Claims, 5 Drawing Sheets

(56) References Cited

U.S. PATENT DOCUMENTS

| | | | |
|---|---|---|---|
| 2010/0008090 A1* | 1/2010 | Li | F21V 17/007 362/249.03 |
| 2013/0293098 A1* | 11/2013 | Li | F21V 3/02 313/512 |
| 2013/0307416 A1* | 11/2013 | Xu | H05B 37/02 315/122 |
| 2015/0091469 A1* | 4/2015 | Wu | H02H 3/243 315/291 |
| 2017/0045187 A1* | 2/2017 | Li | F21S 4/24 |
| 2018/0057677 A1* | 3/2018 | Iwase | C07D 207/448 |
| 2018/0156397 A1* | 6/2018 | Poon (Pan) | F21S 2/00 |

* cited by examiner

LAMP STRIP

CROSS REFERENCE TO RELATED APPLICATIONS

The present application claims the benefit of Chinese Patent Application No. 201721244900.6 filed on Sep. 26, 2017. All the above are hereby incorporated by reference.

FIELD OF THE INVENTION

The present invention relates to the field of lighting technology, particularly to a lamp strip.

BACKGROUND OF THE INVENTION

Because of its characteristics of soft, light, pure color and easy installation, LED lamp strips are widely used in decoration of building contours, steps, booths, bridges, hotels, KTV decorative lighting, advertising signs, advertising designs for animations, scripts and paintings, and so on. When using a flexible lamp strip, it is often necessary to adjust the length of the strip by cutting the strip to meet different requirements in various occasions, but the cutting may easily destroy the LED inside the lamp strip and affects the use. To facilitate the cutting, the lamp strip is usually accompanied with a cut mark, the cut mark is generally disposed on the side facing away from the light source, and the cut mark can be seen through a light-transmitting layer of the lamp strip for cutting.

Since the use of LED lamp strips is more and more widespread, there is a need for different shapes and colors of the strips. Currently, a cut mark is hardly seen through a light-transmitting layer in the condition that the lamp strip is not transparent, making it difficult for appropriate cutting of the lamp strip.

Chinese patent CN206669424U discloses a flexible LED lamp strip with a cut mark and an LED lamp strip easy for cutting, wherein the cut mark is set on the side of the circuit board of the LED lamp strip main body facing away from an LED light source, and the cut mark is further provided with light-transmitting holes, so that the light emitted by the LED light source on the other side of the lamp strip passes through the light-transmitting holes to the other side of the lamp strip, or the light of an external light source on one side passes through the light-transmitting holes to the other side of the lamp strip, thus a user can accurately locate the cutting site, preventing damages to the lamp strip by mis-operation and improving the cutting quality.

In the above-mentioned patent, the cut mark is set on the circuit board of the lamp strip, so the cut mark can only be seen when the lamp lights up or there is an external light source, which is inconvenient to use. In addition, the main body of the light strip needs to be provided with a light-transmitting layer of observation, which not only increases the production cost, but also causes light leak from the light-transmitting layer of observation, thus reducing the luminous efficiency of the lamp strip.

Moreover, at present some LED lamp strips are provided with several LED chips, the LED chips are all connected in series on a flexible lamp panel of the LED lamp strip. If one or some of the LED chips are damaged, the entire LED lamp strip will not work due to disconnection, and the entire lamp strip needs to be repaired or replaced which is inconvenient for users.

SUMMARY OF THE INVENTION

The technical problem to be solved by the present invention is to provide a lamp strip which is simple in structure, convenient for cutting, handy and practical with a prolonged service life, increased durability and few maintenance.

The technical problem to be solved by the present invention is to provide a lamp strip with uniform illumination and pleasing overall appearance.

The technical problem to be solved by the present invention is to provide a lamp strip which is convenient to install and produced in automation To solve the above-mentioned technical problems, the present invention provides an LED lamp strip which comprises an outer casing, an inner casing installed in the outer casing, and a light-emitting component disposed in the inner casing. The light-emitting component includes a substrate and several LED illuminant modules set on the substrate, each LED illuminant module is connected in parallel with each other, each LED illuminant module includes at least one LED light source. The inner casing is provided with a light exit through which the light from the LED light source can directly go out, a cut mark is provided between the light exits locating between the LED illuminant modules in parallel accordingly, and the surface of the outer casing facing the LED light source is of light transmission.

The LED illuminant modules also comprises a protection circuit, the protection circuit is connected in parallel with at least one LED light source, when the LED light source is disconnected, the protection circuit is turned on to maintain the operation of the light-emitting component.

Preferably, the inner casing is provided with a cavity and a slot, the slot is located at a bottom of the inner casing and connects with the cavity, the cavity is attached to the light exit, and the light-emitting component is disposed in the cavity More preferably, the upper surface of the light-transmitting layer has many curved protrusions, and there are many small holes on the side towards the LED light source of the light-transmitting layer.

More preferably, the diameter of each curved protrusion is D, the distance between the peaks of two adjacent curved protrusions is R, the diameter of the small hole is d, and the distance between adjacent small holes is r, the distance between the LED light source and the curved protrusion is L, wherein $$\arctan(R-r)/f = \arccos(D-d)/f.$$

More preferably, the light-emitting component further comprises two conductive strips, the conductive strips are disposed on the substrate laying on both sides of the LED illuminant module, connecting every LED illuminous module in parallel.

More preferably, the conductive strip is a copper wire or a copper plate, the conductive strip is fixed to the substrate by welding.

More preferably, the light-transmitting layer is melt-extruded by a composition of at least two kinds of resins comprising a light diffusion layer of a ridge structure, the light diffusion layer has a thickness of 200 μm to 400 μm.

More preferably, the protection circuit includes a Zener diode that is connected in anti-parallel with at least one LED light source, the Zener diode has a stabilized voltage greater than the terminal voltage when at least one LED light source connected in parallel with the Zener diode operates.

More preferably, the light-emitting component includes at least two LED illuminant modules, the LED illuminant module is composed of at least one LED light source, and the protection circuit comprises a regulated triode, and the A-terminal of the triode is respectively connected with a cathode of one LED light source and an anode of another LED light source, the B-terminal of the triode is connected to an anode of one LED light source, and the C-terminal of the triode is connected to a cathode of another LED light source.

More preferably, the light-emitting component also comprises a current-limiting circuit which is connected in series with the LED light source. The present invention has the following beneficial effects:

1. The LED lamp strip of the present invention has a simple structure, a user can see the cut mark on the inner casing through the light-transmitting layer directly. when setup, the user only needs to cut the lamp strip according to the cutting mark to use, since the cut mark is correspondingly arranged between the LED illuminant modules in parallel, the circuit will not be affected, and thus the illumination guaranteed. The LED lamp strip also comprises a protection circuit, when one or some LED chips are damaged, the protection circuit replaces the damaged LED chip to conduct electricity, so that the lamp strip of the present invention can continue to be energized and illuminate which greatly extends the lifespan and durability of the lamp strip.

2. The light-transmitting layer of the present invention adopts the principle of ommateum. Each curved protrusion severves as a microlens, and multiple curved protrusions as a microlens array for luminous radiation. In addition, having several small holes on the side of the light-transmitting layer facing the LED light source, each small hole acts as a small eye of a compound eye being independent of each other, so that the light passing through the different small holes does not interfere with each other. The light-transmitting layer of the present invention radiates the light emitted by the LED light source, which thereby greatly improves the luminous efficiency and uniformity of the lamp strip, makes the color of the light emitted by the lamp strip more uniform when projected onto the object and avoids discoloration or spotting of the light, thus providing a more pleasing overall appearance of the lamp strip.

The LED lamp strip provided by the present invention, wherein the conductive strip is disposed on the substrate to form a parallel connection of each LED illuminant module, an external power is electrically connected with the substrate, and the conductive strip and the substrate are integrated structures which can be installed by equipment automatically making the installation labor-saving and more efficient.

DETAILED DESCRIPTION OF ILLUSTRATED EMBODIMENTS

Figure 1:
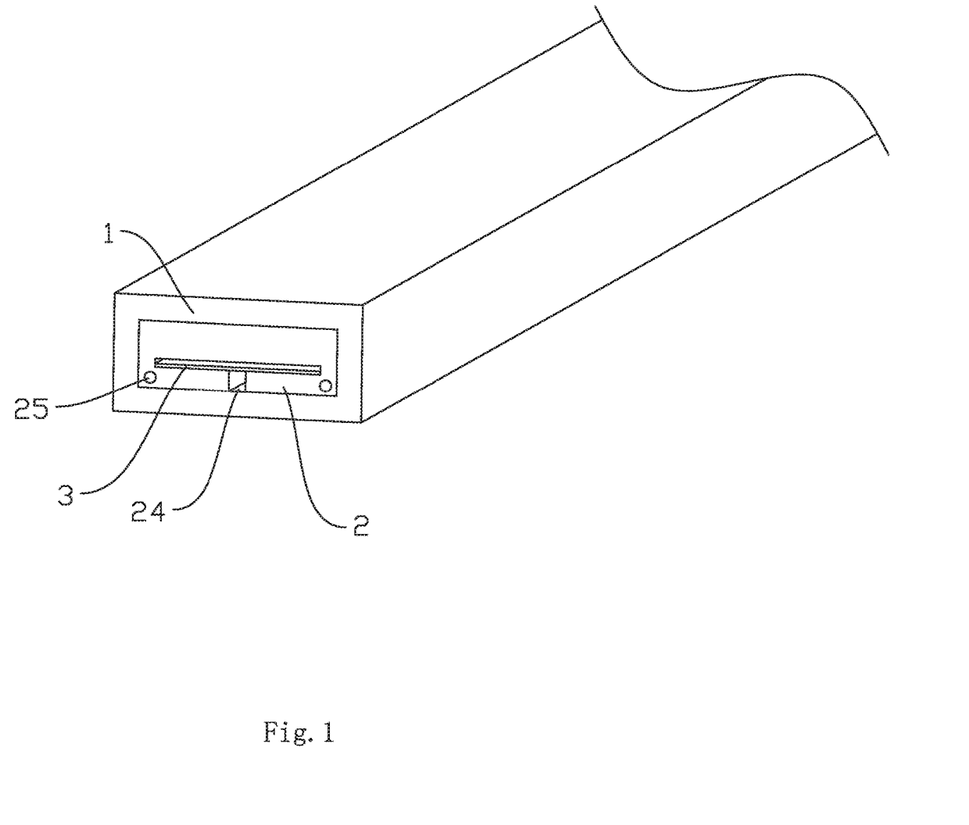
FIG. 1 shows a structural schematic of an LED lamp strip of the present invention.
Figure 2:
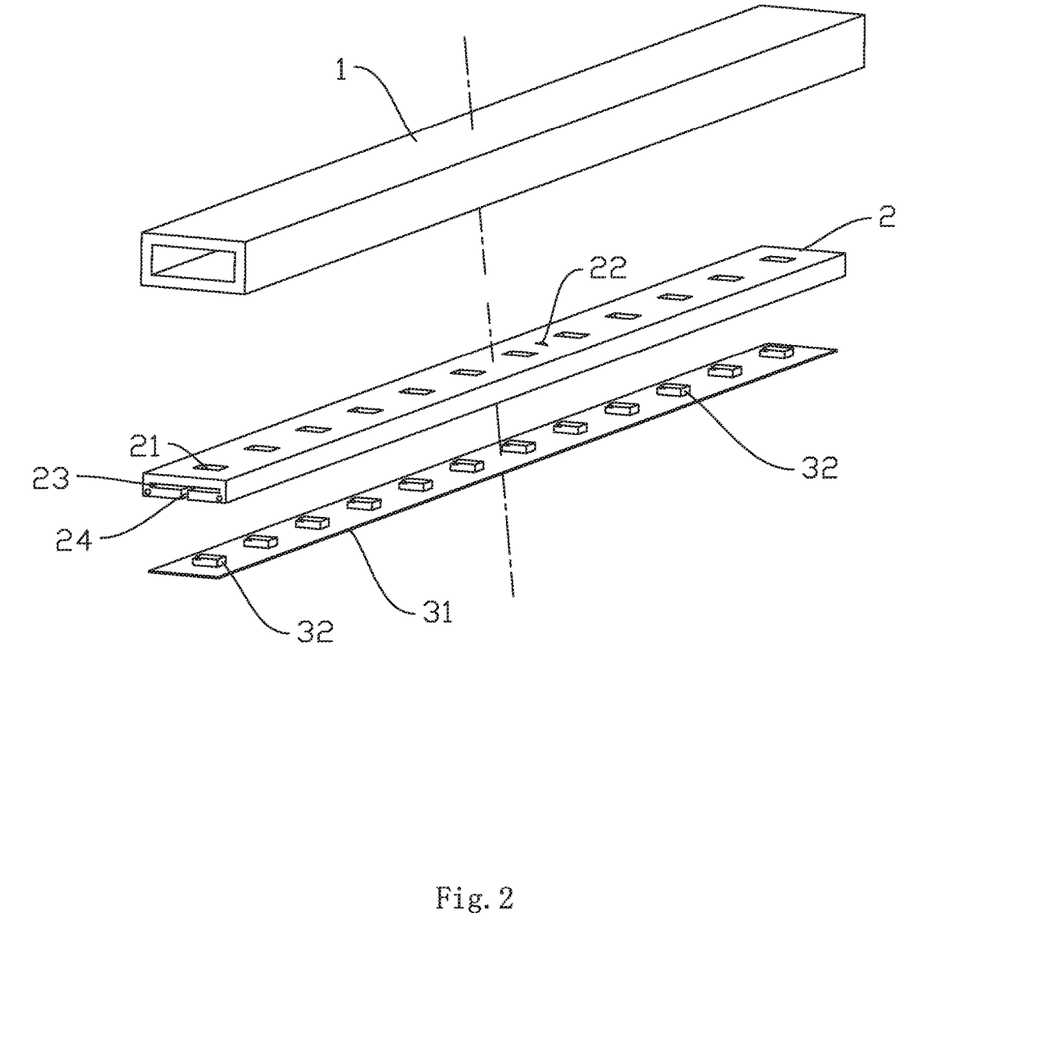
FIG. 2 shows a stereoscopic exploded view of an LED lamp strip of the present invention.
Figure 3:
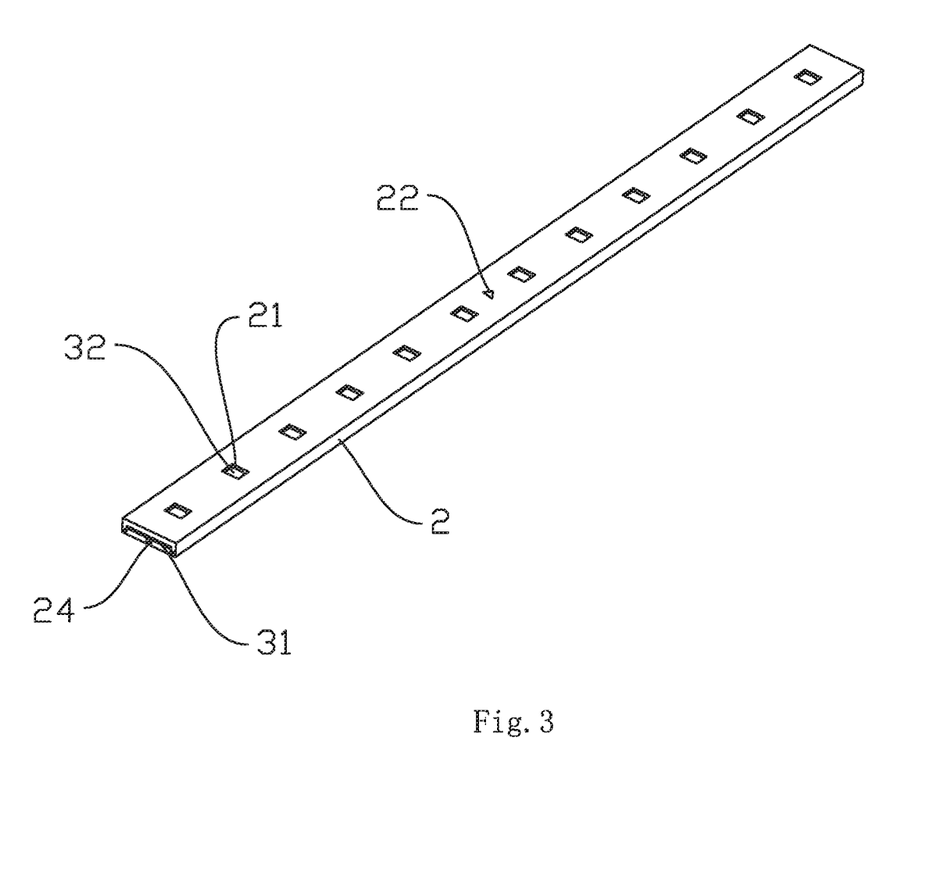
FIG. 3 shows a structural schematic of a light-emitting component installed in an inner casing of the present invention.

To better illustrate the present invention in aspects of the objective, technical scheme and advantages, the present invention is further described in detail with reference to the accompanying drawings Referring to FIG. 1 to FIG. 3, the present invention provided an LED lamp strip which comprised an outer casing 1, an inner casing 2 installed in the outer casing 1, and a light-emitting component 3 disposed in the inner casing 2. The light-emitting component 3 included a substrate 31 and several LED illuminant modules fixed on the substrate 31, each LED illuminant module was connected in parallel with each other, each LED illuminant module included at least one LED light source 32. The inner casing 2 is provided with a light exit 21 through which the light from the LED light source 32 can directly go out, and the light exit 21 is provided with a cut mark 22 laying between the LED illuminant modules in parallel, the surface of the outer casing 1 facing the LED light source 32 is of light transmission.

Specifically, the inner casing 2 was provided with a cavity 23 and a slot 24, and the slot 24 was located at the bottom of the inner casing 2 and connected with the cavity 23, the cavity 23 was attached to the light exit 21, and the light-emitting component 3 was disposed in the cavity 23. The present invention expanded the volume of the cavity 23 by the use of slot 24, thereby facilitating the placement of the substrate 31 into the cavity 23 and insertion of the LED light source 32 into the light exit 21. According to the prior art, the inner casing of the lamp strip has at least one transparent side, and since the LED light source is disposed in the inner casing, the light emitted from the LED light source needs to go through the inner casing. However, in the present invention the light from the LED light source emitted out of the outer casing directly through the light exit without passing through the inner casing, therefore, the inner casing of the present invention could be designed in a variety of colors. What's more, the opaque inner casing could also shield the substrate, that makes the lamp strip more pleasing to the eye and broaden its application.

Further, the inner casing 2 was provided with two wire slots 25 additionally, and the wire slots 25 were provided with wires electrically connected to the substrate 31, and the wires formed a parallel connection for each LED illuminant module. The wire slots 25 were located below the cavity 23 and symmetrically disposed. Moreover, the wires were used to form an electrical connection between the external power and the substrate 31.

Specifically, the substrate 31 was a flexible circuit board, the substrate 31 was provided with several LED light sources 32, and the LED light sources 32 were convex on the substrate 31 and arranged in a row. The inner casing 2 was encapsulated by the injection molding wrapping the substrate 31 inside, and the LED light source 32 protruded from the light exit 21 or in the light exit 21, and the light from the LED light source 32 directly emitted through the light-transmitting layer of the outer casing 1 without passing through the inner casing 2, thereby improving the luminous efficiency of the lamp strip. The cut mark 22 was formed when the inner casing 2 was injection molded, or made after the inner casing 2 was formed, the cut mark 22 could be disposed on the surface of the inner casing 2 or along the inner casing 2. Further, the shape of the cut mark 22 could be a circle, a triangle, an ellipse, a star, a polygon, a line, or the like.

The LED lamp strip of the present invention had a simple structure, when setup, the user only needs to cut according to the cutting mark for use, since the cut mark is correspondingly arranged between the LED illuminant modules in parallel, the circuit will not be affected by the cutting, and thus the illumination guaranteed. In addition, the LED illuminant module of the present invention was equipped with a Zener diode for stabilizing the voltage of the LED illuminant module and ensuring that the lamp strip do work after being cut.

Since the light emitted by the LED light source 32 needs to pass through the light-transmitting layer, in order to improve the light uniformity of the LED lamp strip, the light-transmitting layer was melt-extruded by a composition of at least two kinds of resins comprising a light diffusion layer of a ridge structure, the light diffusion layer had a thickness of 200 µm to 400 µm.

Preferably, the refractivity difference of at least two resins was from 0.01 to 0.06.

Preferably, at least two resins were incompatible, and at least one of the resins was a polyolefin-based resin, wherein the polyolefin-based resin was a polyethylene-based resin, a polypropylene-based resin, or a cyclic polyolefin-based resin.

Preferably, at least two resins were incompatible, wherein two of the resins was polyolefin-based resins, and the polyolefin-based resin was a polyethylene-based resin, a polypropylene-based resin, or a cyclic polyolefin-based resin.

In order to increase the transmittance of the light-transmitting layer of the outer casing 1, the light was concentrated on the surface to prevent light leakage from side walls of the lamp strip, and lateral sides of the outer casing 1 are opaque made of an opaque material.

Figure 4:
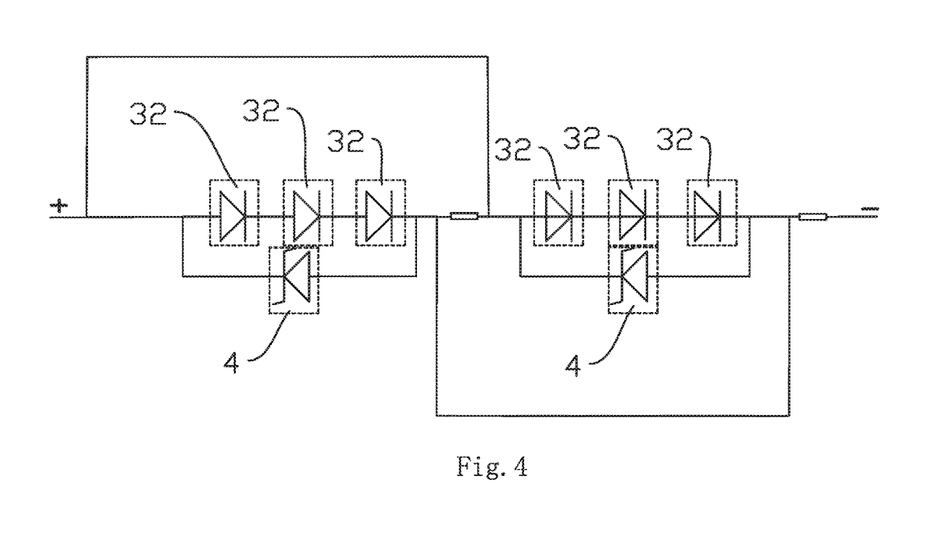
FIG. 4 shows a circuit diagram of an LED lamp strip of the present invention.

As shown in FIG. 4, the present invention comprised a protection circuit 4 that was connected in parallel with at least one LED light source 32, when the LED light source 32 was disconnected, the protection circuit 4 was turned on to maintain the operation of the substrate. That is, when one or some of the LED light sources 32 on the lamp strip was damaged, the protection circuit 4 replaced the damaged LED light sources 32 to conduct electricity, so that the lamp strip of the present invention could continue to be energized and illuminate which greatly extended the lifespan and durability of the lamp strip.

The protection circuit 4 of an embodiment, as shown in FIG. 4, included at least one Zener diode that was connected in anti-parallel with at least one LED light source 32, the Zener diode had a stabilized voltage greater than the terminal voltage when at least one LED light source 32 connected in parallel with the Zener diode operated. There were two Zener diodes in FIG. 4, as the length of the lamp strip increases, there could be more Zener diodes. Each Zener diode was in anti-parallel connection with three LED light sources 32, the regulated voltage of the Zener diode is Ud, the terminal voltage of the three LED light sources 32 is Ua, and Ud was slightly larger than Ua. Since Ua was smaller than Ud, the Zener diode was in a non-conducting state, when any LED light source 32 was damaged, the circuit in parallel with the Zener diode was in an open state, at the instant of opening, the voltage of the Zener diode was equal to the mains voltage, because the mains voltage was larger than the regulated voltage Ud of the Zener diode, the Zener diode was turned on in reverse, the Zener diodes and the remaining LED light sources 32 were then connected in series to form a loop, and the remaining LED light sources 32 were still functional, thus the maintenance frequency reduced and the durability increased.

In addition, the present invention further comprised a current-limiting circuit (see FIG. 4), the current-limiting circuit was connected in series with the LED light source 32, here, the current-limiting circuit was a current limiting resistor, and the current limiting resistor could reduce the current flowing went through the LED light source 32 to ensure the LED light source 32 operated safely and steadily.

Figure 5:
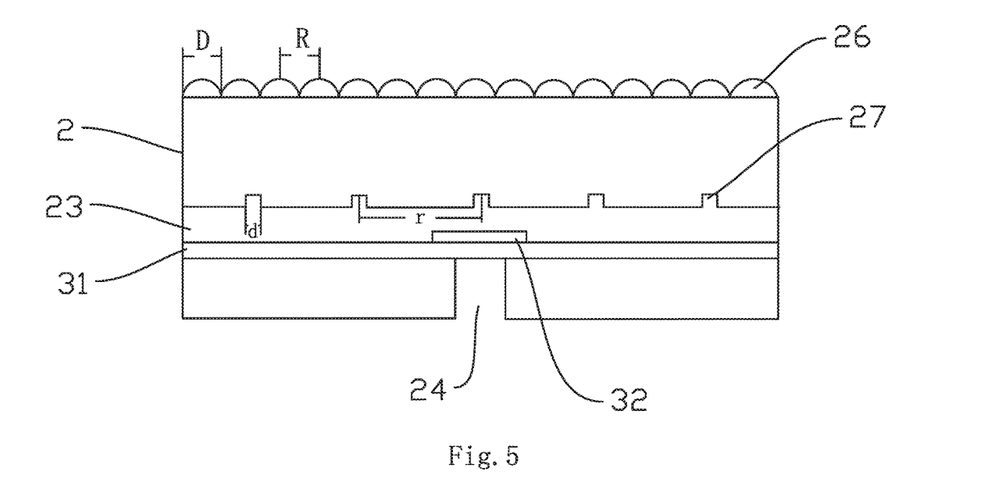
FIG. 5 shows a schematic of an inner casing and a light-emitting component according to one embodiment of the present invention.

In another preferable embodiment of the present invention, as shown in FIG. 5, the upper surface of the light-transmitting surface of the present invention had many curved protrusions 26, and there were many small holes 27 on the side towards the LED light source 32. Specifically, the diameter of each curved protrusion 26 was D, the distance between the peaks of two adjacent curved protrusions 26 was R, the diameter of the small hole 27 was d, and the distance between adjacent small holes 12 was r, the distance between the LED light source 32 and the curved protrusion 26 was L, wherein arctan(R−r)/f=arccos (D−d)/f. The light-transmitting layer of the preferable embodiment adopted the principle of ommateum. Each curved protrusion severved as a microlens, and several curved protrusions as a microlens array for luminous radiation. In addition, having several small holes on the side of the light-transmitting layer facing the LED light source 32, each small hole acted as a small eye of a compound eye being independent of each other, so that the light passing through the different small holes did not interfere with each other. The light-transmitting layer of the present invention radiated the light emitted by the LED light source 32, which thereby greatly improved the luminous efficiency and uniformity of the lamp strip, made the color of the light emitted by the lamp strip more uniform when projected onto the object and avoided discoloration or spotting of the light, providing a more pleasing overall appearance of the lamp strip.

Figure 6:
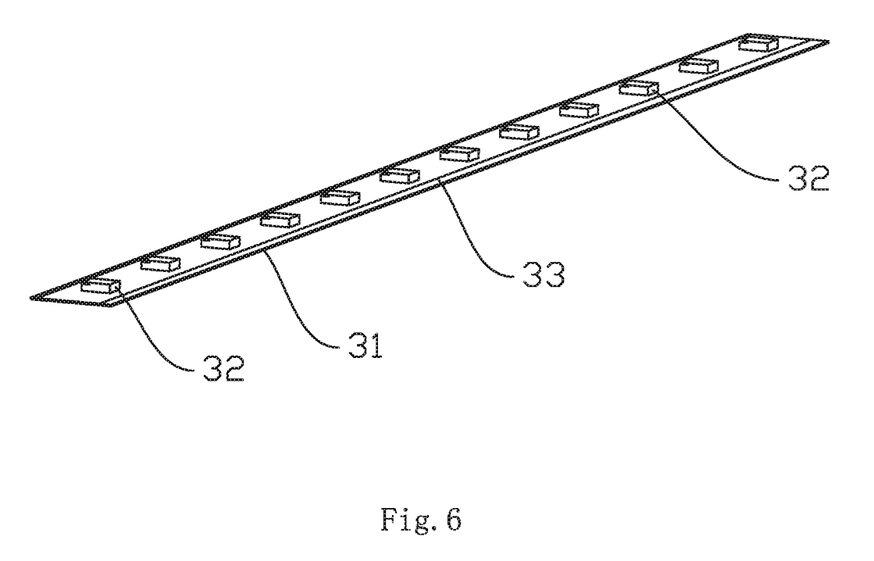
FIG. 6 shows a structural schematic of a light-emitting component according to one embodiment of the present invention.

In another preferable embodiment of the present invention, as shown in FIG. 6, the light-emitting component 3 further included two conductive strips 33 disposed on the substrate 31 laying on both sides of the LED illuminant module, connecting every LED illuminous module in parallel. The conductive strip 33 was a copper wire or a copper plate, but not limited thereto. In the present invention, the conductive strip 33 could also be made of other conductive metals. The conductive strip 33 was fixed to the substrate 31 by welding, together with the substrate 31 as an integral structure. When setup, it is only necessary to mount the substrate 31 in the inner casing 2, while the previous method requires manual insertion of the copper wire into the inner casing 2 to form an electrically conductive connection with the substrate 31 which is inefficient in production. Further, the conductive strips 33 was used to form an electrical connection between the external power and the substrate 31.

The above disclosures are only preferable embodiments of the present invention, the scope of the present invention is not limited thereto, and thus equivalent amendments made in the claims of the present invention are still within the scope of the present invention.

What is claimed is:

1. A lamp strip, wherein the lamp strip comprises an outer casing, an inner casing installed in the outer casing, and a light-emitting component disposed in the inner casing, the light-emitting component includes a substrate and at least two LED illuminant modules set on the substrate, each LED illuminant module is connected in parallel with each other, each LED illuminant module is composed of at least one LED light source, the inner casing is provided with a light exit through which the light from the LED light source can directly go out, a cut mark is provided between the light exits locating between the LED illuminant modules in parallel accordingly, and a side of the outer casing facing the LED light source is a light-transmitting layer;

wherein the lamp strip further comprises a protection circuit, the protection circuit is connected in parallel with at least one LED light source, when the LED light source is disconnected, the protection circuit is turned on to maintain the operation of the light-emitting component;

the protection circuit comprises a regulated triode, and an A-terminal of the triode is respectively connected with a cathode of one LED light source and an anode of another LED light source, a B-terminal of the triode is connected to an anode of one LED light source, and a C-terminal of the triode is connected to a cathode of another LED light source.

2. The lamp strip according to claim 1, wherein the inner casing is provided with a cavity and a slot, the slot is located at a bottom of the inner casing and connects with the cavity, the cavity is attached to the light exit, and the light-emitting component is disposed in the cavity.

3. The lamp strip according to claim 1, wherein an upper surface of the light-transmitting layer has a curved protrusion, and there is a small hole on the side facing the LED light source of the light-transmitting layer.

4. The lamp strip according to claim 1, wherein the light-emitting component further comprises two conductive strips, the conductive strips are disposed on the substrate and located on both sides of the LED illuminant module, connecting the LED illuminous modules in parallel.

5. The lamp strip according to claim 1, wherein the light-transmitting layer is melt-extruded by a composition of at least two kinds of resins comprising a light diffusion layer of a ridge structure, the light diffusion layer has a thickness of 200 μm to 400 μm.

6. The lamp strip according to claim 1, wherein the lamp strip further comprises a current-limiting circuit which is connected in series with the LED light source.

7. The lamp strip according to claim 4, wherein the conductive strip is a copper wire or a copper plate, and the conductive strip is fixed to the substrate by welding.

* * * * *